United States Patent [19]
Carlson

[11] 3,946,595
[45] Mar. 30, 1976

[54] METHOD AND APPARATUS FOR TESTING MOLD VENT ORIFICES

[75] Inventor: Norris J. Carlson, Santa Ana Heights, Calif.

[73] Assignee: California Injection Molding Company, Inc., Costa Mesa, Calif.

[22] Filed: Dec. 6, 1974

[21] Appl. No.: 530,220

[52] U.S. Cl. .................................. 73/37; 73/37.5
[51] Int. Cl.² ...................................... G01M 3/00
[58] Field of Search ........... 73/37, 37.5, 37.8, 37.9, 73/40, 49.2

[56] References Cited
UNITED STATES PATENTS

| | | | |
|---|---|---|---|
| 2,266,566 | 12/1941 | Poole | 73/37 X |
| 2,853,874 | 9/1958 | Mennesson | 73/40 |
| 2,939,314 | 6/1960 | Prince | 73/40 |
| 3,433,055 | 3/1969 | Booy et al | 73/37.5 |
| 3,508,432 | 4/1970 | Marshall, Jr. et al | 73/37.8 |
| 3,800,586 | 4/1974 | Delatorre et al | 73/49.2 |

FOREIGN PATENTS OR APPLICATIONS 527,989  6/1931  Germany ...................... 73/37

Primary Examiner—Richard C. Queisser
Assistant Examiner—Joseph W. Roskos
Attorney, Agent, or Firm—Gausewitz, Carr & Rothenberg

[57] ABSTRACT

In the injection molding of elongated thin walled articles, air within the mold escapes from the mold cavity through vent orifices in the cavity and in an elongated core positioned within the cavity. To determine whether critical mold venting is within desired tolerances, a relatively high pressure gas is applied to the vent orifice and pressure is allowed to decay by escape through the orifice. Time required for a predetermined magnitude of pressure drop is measured and employed as an indication of vent orifice acceptability.

9 Claims, 5 Drawing Figures

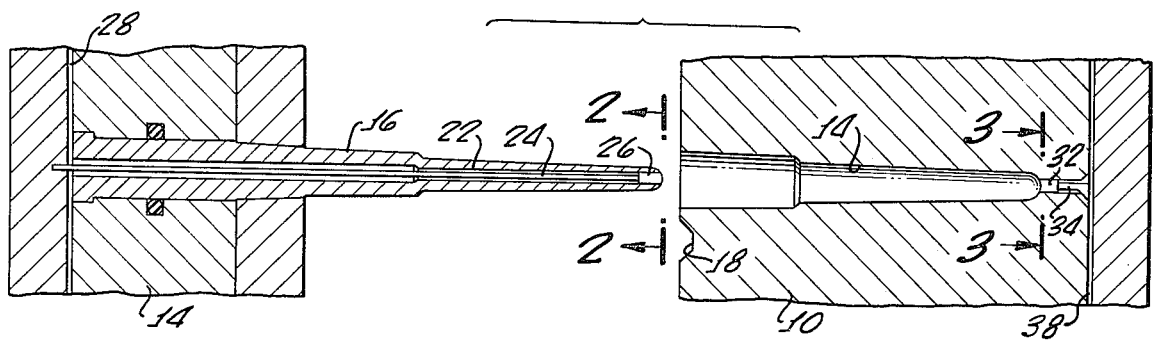
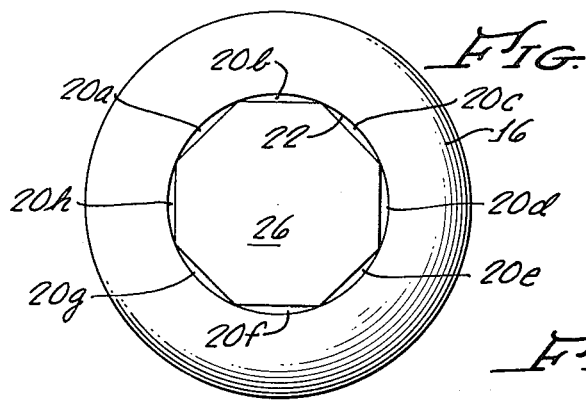
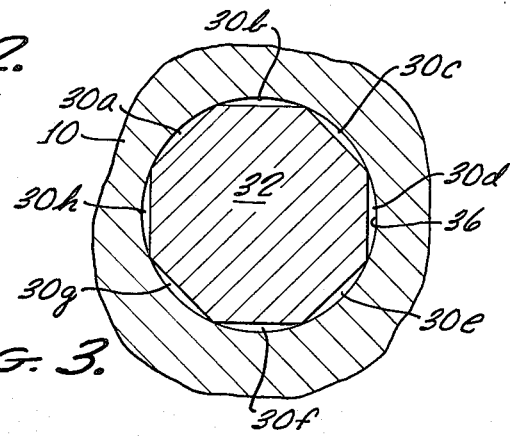
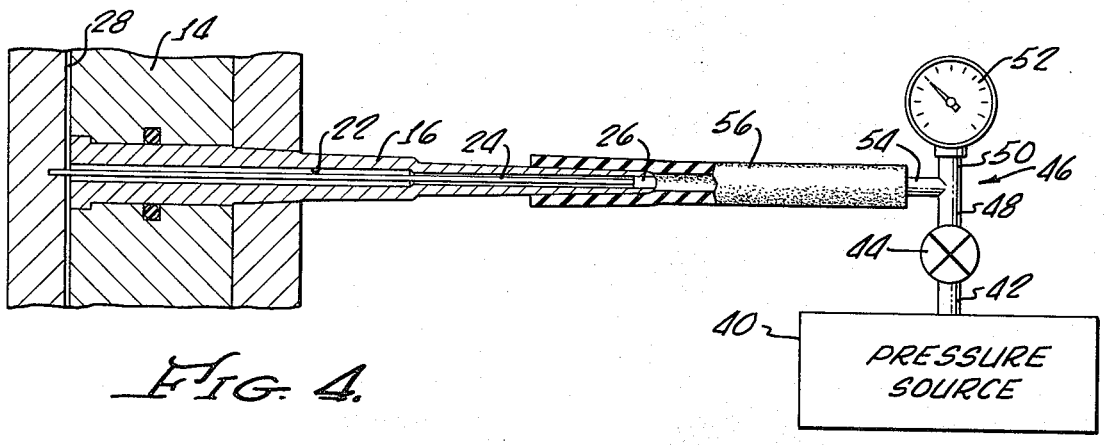
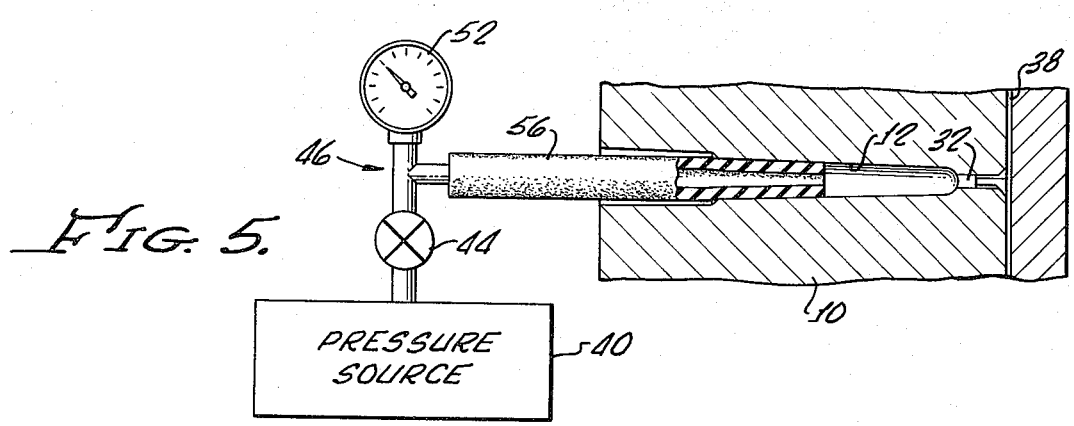

METHOD AND APPARATUS FOR TESTING MOLD VENT ORIFICES

BACKGROUND OF THE INVENTION

The present invention relates to the operation of molding apparatus and more particularly concerns testing of vent orifices of injection molding equipment.

In operation of various types of molding apparatus, air within the mold cavity must be exhausted as molding material is caused to flow into the cavity. In many types of molding machines, this venting poses little or no problem. However, for the molding of certain types of articles, proper control and operation of cavity venting can be critical. It may be essential to the production of satisfactory articles. Criticality of venting orifice operation can arise because of the necessity to eliminate or minimize flash, the escape of hot molding material through the venting orifice, without unduly restricting vent flow rates. In some types of equipment, two mutually conflicting requirements of venting orifices must be met and balanced. On the one hand, vent orifices must be small enough to prevent undesired flash and on the other hand, the orifices must be large enough to permit an adequate rate of venting of the cavity gas and thus permit rapid injection of mold material. In some cases, the venting must not only be sufficiently rapid, but must be properly balanced throughout selected areas of the mold cavity.

An example of such criticality of mold venting is found in the molding apparatus describing in a copending application of Gilbert and Pfau, for Method and Apparatus for Molding Elongated Thin Wall Articles, Ser. No. 515,818, filed on Oct. 18, 1974, and assigned to the assignee of the present invention. In this copending application, the disclosure of which is incorporated by this reference as though fully set forth herein, there is described apparatus for injection molding of disposable thin wall medical thermometer probe covers having a wall thickness at the tip in the order of 0.010 inches (ten thousandths of an inch). These probe covers must have smooth outer surfaces because they are to be inserted into body cavities and, therefore, flash must be eliminated or minimized. The machines are operated cyclically, requiring less than 20 seconds for a full cycle of operation, and injection of the hot mold material is rapid. Concomitantly, the rate of venting of the mold cavity is high to enable the rapid injection of mold material. Not only must the vent rate be sufficiently high, but the venting must be circumferentially balanced. The thin wall, elongated article is molded within a cavity into which is inserted a rigid elongated core. In order to minimize deflection of this core, which is cantilevered at one end, it is necessary that the inflow of hot molding material be balanced or equally distributed about the circumference of the core as the material is injected from a point near the fixed end of the core toward the tip of the core. If venting of the cavity gases occurs at a greater rate at one side of the cavity than the other, flow of hot mold material into the cavity will take place at a greater rate on one side of the core than the other. The hot mold material is injected into the cavity under pressures of many tons and thus, an imbalance of the inflowing material will create large magnitude lateral forces on the core which displace this elongated cantilevered element toward one side or the other of the circumscribing mold cavity. Because wall thickness of the finished article is nominally 0.010 inches, and because the mold material will not flow through a space less than 0.005 inches, deflection of the core that is greater than 0.005 inches cannot be tolerated since it will result in an incomplete article, an article having discontinuities.

In order to satisfy these rigid requirements of cavity venting, the apparatus of the copending application of Gilbert and Pfau describes a venting arrangement in which a circular array of vent orifices is provided at the end of the mold cavity. The array is formed by a number of discrete orifices individually of small size but collectively providing a greater vent rate. Nevertheless, additional venting is provided through the length of the core by a similar circular array of small size discrete orifices formed in the tip of the core and communicating through the length of the core with atmosphere outside of the mold. If these orifices are too large, undesirable flash will occur and the resulting articles will not be satisfactory. If the orifices are too small, venting is inadequate or unbalanced and the resulting article may be unacceptable because of formation of pin holes or other discontinuities. The high temperatures and pressures involved in the injection molding process may cause burning of the core and cavity material defining the orifices or may result in build up of mold material in or about the orifices, thereby changing vent orifice dimension and adversely affecting vent rate, vent balance or both.

To applicant's knowledge, mold vent orifices have not previously been tested. Accordingly, it is an object of the present invention to test mold vent orifices.

SUMMARY OF THE INVENTION

In carrying out principles of the present invention in accordance with a preferred embodiment thereof, adequacy of a vent orifice is tested by applying fluid under pressure to the orifice and causing the fluid to flow through the orifice. Time required for pressure of the fluid as applied to the orifice to decrease by a preselected magnitude as it escapes through the orifice is detected and this time is employed as a measure of orifice characteristics. More specifically, a relatively high pressure is applied to the cavity orifices or the core orifices by means of a flexible conduit pressed into sealing engagement therewith and pressure is increased until it rises above a predetermined value, at which time the pressure source is isolated from the orifice. As the pressure at the orifice decays by flow through the orifice, the time interval in initiated at a first predetermined pressure value and terminated at a second predetermined pressure value to thereby indicate, by the length of the intervening time interval, characteristics of the orifices under test.

BRIEF DESCRIPTION OF THE DRAWINGS

FIG. 1 schematically illustrates male and female mold parts of an injection molding apparatus having vent orifices that may be tested in accordance with the present invention.

FIGS. 2 and 3 are views taken respectively on lines 2—2 and 3—3 of FIG. 1 showing, greatly enlarged, the vent orifices to be tested;

FIG. 4 illustrates vent orifice testing apparatus of the present invention applied to test orifices in the mold core; and FIG. 5 illustrates test apparatus of the invention applied to test vent orifices in the mold cavity.

DETAILED DESCRIPTION

Schematically illustrated in FIG. 1 are fragments of a thirty two cavity molding apparatus of the type more particularly described in the above-identified copending application of Gilbert and Pfau. The apparatus is designed to form disposable thin wall covers for digital medical thermometers, each cover being about four inches long, having a maximum diameter of about three-eighths of an inch and having a nominal wall thickness at the temperature sensing tip of 0.010 inches. To mold these covers, the apparatus includes a female mold part 10 having an elongated mold cavity 12 formed therein for cooperation with a male mold part 14 that carries a cantilevered elongated core 16. The parts are shown in relatively displaced position and one part, the male mold part, for example, is movable while the other is fixed, so that the parts may move from the illustrated open position to a closed position in which core 16 is fully inserted into cavity 12. In closed position the core cooperates with the cavity to define an annular mold cavity space between the interior of the cavity 12 and the exterior of the core 16. Hot pressurized mold material is injected into the annular cavity space by means of a runner or passage 18 formed in the female mold part 10 which communicates (by means not shown) with the interior of the cavity 12.

Elements illustrated in FIG. 1 are parts of a molding apparatus which in a preferred form embodies an array of 32 identical cavities and core pins carried on the female and male mold parts respectively whereby 32 probe covers may be made upon each cycle of mold operation.

Venting of the cavity with the mold parts in closed position, while the hot pressurized mold material is being injected, is achieved in part through the core 16 and in part, through the end of the female mold part 10. Venting through the core is provided by means of a substantially circular array of core vent cavities 20a, 20b, 20c, 20d, 20e, 20f, 20g and 20h defined between the inner surface of a bore 22 extending longitudinally through the core 16 and the outer surface of a core pin 24 having an octagonal head 26 that fits within the bore 22. Core bore 22 and pin 24 contained therein extend through the core 16 for communication with a fluid conduit 28 formed in the male mold part 14. Conduit 28 communicates with ambient atmosphere by means not shown in FIG. 1.

The inner end of vent cavity 12 of the female mold part 10 is similarly provided with a circular array of discrete vent orifices 30a, 30b, 30c, 30d, 30e, 30f, 30g, and 30h, defined between the octagonal head 32 of a vent pin 34 and the inner surface of a bore 36 that provides communication between the inner tip of cavity 12 and a passage or conduit 38 formed in the female mold part 10. Conduit 38 extends through the female mold part for communication with ambient atmosphere.

As described above, proper operation of the vent orifice is essential to the production of satisfactory molded articles in this apparatus. If the orifices are too large flashing will occur, such flashing being unacceptable for devices of this type. On the other hand, if the vent orifices are too small or not properly balanced, that is, if all orifices of one circular array are not substantially equal in size, vent rate may be inadequate or velocity of escaping gases may be so high as to severely burn either the material forming the orifices or the plastic mold material at or about the orifices. Further, unbalanced venting may cause unacceptable core deflection. Accordingly, upon manufacture of a new apparatus or repair of old apparatus of the type illustrated in FIG. 1, size of the vent orifices of each of the cavities and of each of the cores must be checked. Further, in the course of operation of the apparatus, deposits may build up at or about the orifices thus tending to plug these venting apertures and improperly restrict flow therethrough. Inspection of a finished article (thermometer cover) may help in determining whether or not operation is proper and whether or not testing of the orifices is required. For example, plugged or unduly restricted vent orifices may result in discontinuities or small holes formed in the finished article because of improper distribution of the inflowing plastic mold material. Thus, such inspection of the finished article may reveal a need for testing or inspection of the vent orifices by indicating malfunction of the injection molding apparatus.

Principles of the present invention are readily applied to testing of orifices in this manner and for this purpose. The invention provides a simple, readily assembled apparatus and a simple, easily performed method for determining whether the vent orifices are either too large or too small. The same apparatus is readily applied to test both core and cavity orifices.

Apparatus of the present invention includes a source of gas pressure such as an air compressor 40 that is connected via a conduit 42 and a hand operated shut off valve 44 to a T fitting 46. One branch 48 of the T fitting is connected to the valve 44 and the other branch 50 thereof is connected to a conventional pressure gauge 52. The stem 54 of the T is connected to a length of conduit 56. Conveniently, conduit 56 may comprise a short length of polyethelyne tubing for example, of about 6 to 8 inches in length and having an inside diameter of approximately 5/16 of an inch for use in testing the above-described apparatus. It will be readily understood, of course, that the size and length of the conduit 56 may be varied as deemed necessary or desirable to provide a proper cooperation and sealing with the parts carrying the orifices to be tested.

For testing of the orifices in the free end of the cantilevered core 16, the free end of conduit 56 is merely inserted over the end of the core and, being somewhat elastic, the conduit stretches slightly over the tapered core to provide a sealing engagement therewith. Valve 44 is then opened and pressure allowed to build up, as indicated by gauge 52, to a selected value, such as, above 50 pounds per square inch, for example. Then, valve 44 is closed to isolate the pressure source from the conduit 56 and orifices in the core 16. Pressure within the conduit 56, at the orifices, escapes through the orifices, through the bore 22 and through the conduit 28 formed in the male mold part 14. As the pressurized fluid within conduit 56 escapes, pressure decays. When the pressure gauge 52 indicates a pressure of 50 lbs. per square inch, for example, a time interval is initiated. Conveniently, the operator may visually monitor the falling pressure indication of gauge 52 and start operation of a conventional hand-held stop watch.

When pressure, as indicated by gauge 52, has fallen to a second predetermined level, 20 lbs. per square inch for example, the stop watch is again operated to terminate the interval, which is then measured. Maximum allowable time for decay of pressure, in an exemplary embodiment, from 50 lbs. per square inch to 20 lbs. per square inch is 8 seconds. If the time interval required for this pressure to drop, in this example, is greater than 8 seconds, it is known that the vent orifices are unacceptably clogged, whereupon the vent pins are removed and the apparatus repaired or replaced as necessary. If the time interval is significantly less than 4 seconds, then the vent orifices are carefully inspected to ensure that they are not oversized, since the short time interval indicates oversized orifices, which are unacceptable. An additional reason for establishing a minimum time of decay from 50 to 20 pounds per square inch is to balance vent rate from one set of core and cavity to another within a given apparatus. Not only is it necessary to provide balanced vent rate within a given cavity, but vent rate and therefore, injection flow rate, must be substantially equal from one cavity to another within one multi-cavity mold apparatus in order to provide proper operation of a multi-cavity mold.

Illustrated in FIG. 5 is application of the apparatus for testing of vent orifices in a cavity 12 of the female mold part 10. It will be readily observed that the identical apparatus illustrated and described in connection with FIG. 4 may be employed for testing of vent orifices of either of the elongated cores 16, (FIG. 4) or the elongated cavity 12 (FIG. 5). For testing of the cavity, conduit 56 is merely inserted into the cavity via the open end thereof and, upon insertion, is somewhat elastically compressed within the tapered bore of the cavity to provide a sealing engagement therewith. Now the testing procedure for the cavity is exactly the same as that previously described for the core. Valve 44 is opened to allow pressure source 40 to increase the pressure within the conduit 56 and cavity 12 adjacent the orifices of the cavity to a pressure above a predetermined pressure, which in the cavity too may be 50 pounds per square inch. When the pressure, as indicated on gauge 52, rises above this level, valve 44 is closed to isolate the pressure source from the orifices and allow the pressure to begin its decay. A time interval is initiated when pressure decays to the predetermined level of 50 pounds per square inch. Thereafter, when the pressure drops to 20 pounds per square inch, the time interval is terminated and employed as a measure of vent orifice size. Again, in the exemplary test operation, a time interval of greater than 8 seconds (for a pressure to drop from 50 to 20 psi) indicates vent orifices that are unacceptably restricted or plugged by deposits and the like, whereupon repair or replacement is required. Similarly, a time interval of less than four seconds may indicate vent orifices that are too large and which may be likely to cause unacceptable flash. Further, as previously described, it is necessary that the time interval (for pressure decay from 50 to 20 psi) be within the range of 4 to 8 seconds for all cavities of a single apparatus in order to provide evenly distributed venting and therefore evenly distributed flow of hot mold material to all of the cavities.

In the methods illustrated in FIGS. 4 and 5, frictional engagement of the conduit 56 with the core or cavity will suffice to maintain the sealing engagement, although the operator may grasp the conduit and continue to force it axially toward the orifices under test, if deemed necessary or desirable.

It will be readily understood that the method and apparatus of the present invention, although designed for testing vent orifices of the specifically described molding apparatus may also be applied for testing of vent orifices of other apparatus and may be readily modified in various respects without departing from principles of the present invention. Thus, in the place of a hand operated valve 44, one may employ a check valve which automatically isolates the pressure source from the pressurized area within conduit 56 adjacent the orifice. One may employ other and different types of pressure detecting instruments instead of the gauge 52. It is also contemplated, where automatic operation is desired, to provide for automatic measurement and operation of the time interval. For example, suitable pressure sensitive mechanisms and electronic or mechanical switches may be connected with the pressurized area within conduit 56 so as to provide electrical signals which both initiate a time interval at a first pressure and terminate the time interval at a second pressure, the time interval being electronically measured and/or recorded to directly indicate the elapsed time or being calibrated in terms of flow rate or orifice dimension. Further, arrangements other than the simple flexible polyethelyne conduit 56 may be employed for connection of the pressure source to the orifices. Where greater precision of measurement is required, the pressurized volume within the conduit 56 between valve 44 and the orifice may be increased as by fluid communication with a sealed pressure receiving chamber (not shown), for example. The larger volume of pressurized fluid adjacent the orifice accordingly requires a greater time for decay of pressure from one level to another through an orifice of a given size, and thus a greater precision of measurement (a longer time interval for a given orifice size) would be available with such an arrangement.

It will be readily understood that the specific values of the various parameters set forth in the exemplary description are provided solely for purposes of exposition and are not intended by way of limitation. Thus, different lengths or sizes of tubing may be used for conduit 56. Pressures other than the exemplary 50 psi and 20 psi may be employed. Further, for different sizes of vent orifices, different times and/or different pressures may be employed. Nevertheless, in a specific example employed for testing of vent orifices of the core and cavity of the molding apparatus described in the above-identified copending application of Gilbert and Pfau, it has been found that the first predetermined level of the pressure at which the time interval is initiated should be 40 psi or above. Further, the second predetermined pressure, the pressure at which the time interval is terminated, should not be below 20 psi since flow rate below this pressure decreases to a value which introduces significant errors. Although 40 psi may be considered to be a minimum pressure for starting the time interval, it is preferred to employ a pressure drop of at least 30 psi and accordingly, the preferred pressure levels are 50 psi and 20 psi as previously mentioned. Obviously, higher pressures may be employed. Of course, the choice of different pressure levels, levels other than the 50 and 20 psi referred to above, would yield different time intervals and ranges of times providing satisfactory test results. Such pressures and time intervals are preferably determined empirically.

For such an empirical determination, for use in testing a mold which has been in operation for some time, for example, a plurality of completed molded articles from one mold cycle (thirty two articles with the exemplary apparatus) are each identified according to the particular cavity and core of the apparatus in which it was formed and each article is inspected to determine acceptability. Some of the articles will be found to be acceptable and others may have holes or discontinuities indicating plugged venting. All of the venting orifices of all cavities and cores of the apparatus are then tested, employing the same pressure levels for starting and ending the test time intervals. A range of time intervals will then be found that correlate with at least a group of vent orifices of cavities and cores that provided acceptable articles. Likewise, a range of time intervals may be found above the first mentioned range which correlates with vent orifices of cores and cavities that produced unacceptable articles. Thus, the testing is empirically calibrated for a given apparatus.

There have been described simple, rapid, efficient and accurate methods and apparatus for testing of vent orifices of injection molding apparatus and which provides information not previously available concerning operation of such apparatus.

The foregoing detailed description is to be clearly understood as given by way of illustration and example only, the spirit and scope of this invention being limited solely by the appended claims.

I claim:

1. The method of testing size of a venting orifice in a molding machine comprising the steps of
    coupling the orifice to a source of pressure,
    building up pressure at the orifice above a predetermined value and thereafter isolating the orifice from the pressure source,
    causing the built up pressure to decrease by flow through said orifice,
    initiating a time interval upon decrease of the built up pressure to said predetermined value, and
    terminating said time interval upon decrease of the built up pressure to a second and lower predetermined value, thereby to indicate size of said venting orifice by the length of said time interval.

2. The method of claim 1 wherein said orifice is formed in an elongated core and wherein coupling of said orifice to a source of pressure includes inserting said core into sealing engagement within one end of a conduit that is connected at its other end to said pressure source.

3. The method of claim 1 wherein said orifice is formed in an end of an elongated mold cavity and wherein said step of coupling the orifice to a source of pressure comprises inserting into said cavity in sealing relation thereto one end of a fluid conduit that is connected at its other end to said pressure source.

4. The method of claim 1 including the step of calibrating said testing, said calibrating comprising inspecting a plurality of articles made by such molding machine for acceptability, identifying an acceptable article, identifying a molding machine venting orifice employed in the manufacture of said acceptable article, testing said identified orifice by the steps set forth in claim 1, and measuring said time interval to provide a calibrated reference time interval for subsequent testing of other orifices.

5. The method of testing size of a vent orifice in molding apparatus comprising the steps of
    connecting one end of a fluid conduit in sealing engagement with said orifice,
    connecting another end of said conduit to a source of fluid pressure,
    connecting a flow control valve in said conduit between said pressure source and said orifice,
    connecting a pressure sensitive device to said conduit between said valve and said orifice,
    opening said valve to allow fluid under pressure to flow from said source into said conduit and to said orifice,
    closing said valve when pressure in said conduit at said orifice, as indicated by said pressure sensitive device, is not less than a first predetermined value,
    initiating a time interval when pressure, as indicated by said pressure sensitive device, begins to drop from said predetermined value, and
    terminating said time interval when said pressure, as indicated by said pressure sensitive device, drops to a second and lower predetermined value.

6. The method of claim 5 wherein said orifice is formed in a free end of an elongated core of the molding apparatus and wherein the step of connecting said conduit to said orifice comprises the step of inserting said end of said core into an end of said conduit in sealing relation thereto.

7. The method of claim 5 wherein said orifice is formed in an end of an elongated mold cavity of the molding apparatus and wherein said step of connecting said conduit to said orifice comprising the steps of inserting said conduit into said cavity in sealing relation thereto.

8. Apparatus for testing size of vent orifices of at least one of an elongated vented mold core and an elongated vented mold cavity of injection molding apparatus, said testing apparatus comprising
    a flow control valve adapted to be connected at one side thereof to a source of fluid pressure,
    a flexible conduit connected at one end to a second side of said flow control valve, said conduit having a free end adapted to be inserted in sealing engagement into said elongated mold cavity, and further adapted to be inserted in sealing engagement over the end of said elongated mold core for application of fluid under pressure to the interior of said cavity or to the end of said core, and
    a pressure gauge connected in fluid communication with said conduit and said second side of said valve, whereby pressure may be applied through the valve, when open, to the conduit and thence to the orifice under test, and whereby the valve may be closed when the pressure rises above a predetermined level, and thereafter the time required for decay of pressure from said predetermined level to a second lower predetermined level may be measured in conjunction with said pressure gauge to thereby indicate undesired restriction of the orifice under test.

9. The method of testing vent orifices in a multi-cavity molding machine comprising the steps of
    collecting a set of molded articles formed in a single mold cycle of a multi-cavity molding apparatus having vent orifices,
    identifying each of the articles according to the particular mold cavity in which it was formed,
    inspecting each article to determine acceptability,
    testing at least a group of said cavities for vent orifice size, said testing step comprising
        applying fluid under pressure to the cavity ofifice,
        causing fluid under pressure to flow through the orifice,
        detecting a measured time required for pressure of said fluid as applied to the orifice to decrease by a preselected amount as it escapes through said orifice, and
employing such measured time as a measure of the orifice size,
identifying the measured time detected for cavity orifices corresponding to those articles determined to be acceptable thereby to calibrate the testing of said orifices.

* * * * *